(12) United States Patent
Baughman

(10) Patent No.: US 8,959,357 B2
(45) Date of Patent: Feb. 17, 2015

(54) BIOMETRIC ENCRYPTION AND KEY GENERATION

(75) Inventor: Aaron Keith Baughman, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 12/837,157

(22) Filed: Jul. 15, 2010

(65) Prior Publication Data
US 2012/0014520 A1      Jan. 19, 2012

(51) Int. Cl.
*H04L 9/32*      (2006.01)
*H04L 9/08*      (2006.01)

(52) U.S. Cl.
CPC .................................. *H04L 9/0866* (2013.01)
USPC ............... 713/186; 713/175; 713/182; 726/2; 726/3; 726/4; 726/5; 380/44

(58) Field of Classification Search
USPC .................... 380/44; 713/172, 175, 182, 186; 726/2–5
See application file for complete search history.

(56) References Cited

U.S. PATENT DOCUMENTS

| | | | |
|---|---|---|---|
| 6,230,272 B1 | 5/2001 | Lockhart et al. | |
| 6,453,416 B1 * | 9/2002 | Epstein | ......................... 713/170 |
| 7,302,583 B2 | 11/2007 | Forrest | |
| 2002/0030582 A1 * | 3/2002 | Depp et al. | ................... 340/5.53 |
| 2002/0104006 A1 * | 8/2002 | Boate et al. | ................... 713/186 |
| 2003/0088782 A1 | 5/2003 | Forrest | |
| 2007/0204167 A1 | 8/2007 | Beker et al. | |
| 2008/0155269 A1 * | 6/2008 | Yoshikawa | ..................... 713/186 |
| 2009/0100265 A1 * | 4/2009 | Tadokoro | ...................... 713/172 |
| 2010/0119061 A1 * | 5/2010 | Kawale | ........................... 380/44 |
| 2010/0205658 A1 * | 8/2010 | Griffin | .............................. 726/5 |

FOREIGN PATENT DOCUMENTS

WO      2007036763 A1      4/2007

OTHER PUBLICATIONS

Pirretti et al., "Secure Attribut-Based Systems", CCS '06, Oct. 30-Nov. 3, 2006, pp. 99-122.
Gajek et al., "Provably Secure Browser-Based User-Aware Mutual Authentication of TLS", ASISCCS '08, Mar. 18-20, 2008, pp. 300-311.
Goyal et al., "Attribute-Based Encryption for Fine-Grained Access Control of Encrypted Data", CCS '06, Oct. 30-Nov. 3, 2006, pp. 89-98.
Hao et al., "Combining Crypto with Biometrics Effectively", IEEE Computer Society, IEEE Transactions on Computers, vol. 55, No. 9, Sep. 2006, pp. 1081-1088.

* cited by examiner

*Primary Examiner* — Venkat Perungavoor
*Assistant Examiner* — Amir Mehrmanesh
(74) *Attorney, Agent, or Firm* — Douglas A. Lashmit; Hoffman Warnick LLC

(57) ABSTRACT

A system, method and program product for generating a private key. A system is disclosed that includes a signal acquisition system for obtaining biometric input from a user and encoding the biometric input into an acquired biometric; a recognition system for determining an identity based on the acquired biometric and outputting an absolute biometric associated with the identity; an input device for accepting a knowledge input from the user; and a key generator that generates a private key based on the knowledge input and the absolute biometric.

13 Claims, 2 Drawing Sheets

BIOMETRIC ENCRYPTION AND KEY GENERATION

BACKGROUND

The present invention relates to cryptosystems, and more particularly to a system and method of generating a private key for a user utilizing a biometric sample and user knowledge.

Public-key cryptography is a cryptographic approach which involves the use of asymmetric key algorithms. Unlike symmetric key algorithms, it does not require a secure initial exchange of one or more secret keys to both sender and receiver. The asymmetric key algorithms are used to create a mathematically related key pair: a secret private key and a published public key. Use of these keys allows protection of the authenticity of a message by creating a digital signature of a message using the private key, which can be verified using the public key. It also allows protection of the confidentiality and integrity of a message, by public key encryption, encrypting the message using the public key, which can only be decrypted using the private key.

In traditional cryptosystems, the private key is generated from a chosen implementation (e.g., openssl, keystore, etc.) with a selected set of bootstrap parameters such as DES, AES, Blowfish, etc. Additional information such as a distinguished name is asserted within the certificate to provide a token of identity. A certificate authority signs the certificate, which establishes authenticity of the certificate.

BRIEF SUMMARY

The presented invention generates a private key with biometric information and knowledge, such as a byte string of encoded biometric data and a user password. As a result, a person's identity and knowledge acts as the private key for a cryptology system. According to one embodiment of the present invention, a system is provided for generating a private key, comprising: a signal acquisition system for obtaining biometric input from a user and encoding the biometric input into an acquired biometric; a recognition system for determining an identity based on the acquired biometric and outputting an absolute biometric associated with the identity; an input device for accepting a knowledge input from the user; and a key generator that generates a private key based on the knowledge input and the absolute biometric.

In a second embodiment, a computer program product is provided for generating a private key, the computer program product comprising: a computer readable storage medium having computer readable program code embodied therewith, the computer readable program code comprising: program code for encoding a biometric input from a user into an acquired biometric; program code for determining an identity based on the acquired biometric and outputting an absolute biometric associated with the identity; program code for accepting a knowledge input from the user; and program code for generating a private key based on the knowledge input and the absolute biometric.

In a third embodiment, a method for generating a private key is provided, comprising: encoding a biometric input from a user into an acquired biometric; determining an identity based on the acquired biometric and outputting an absolute biometric associated with the identity; receiving a knowledge input from the user; and generating a private key based on the knowledge input and the absolute biometric.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

Figure 1:
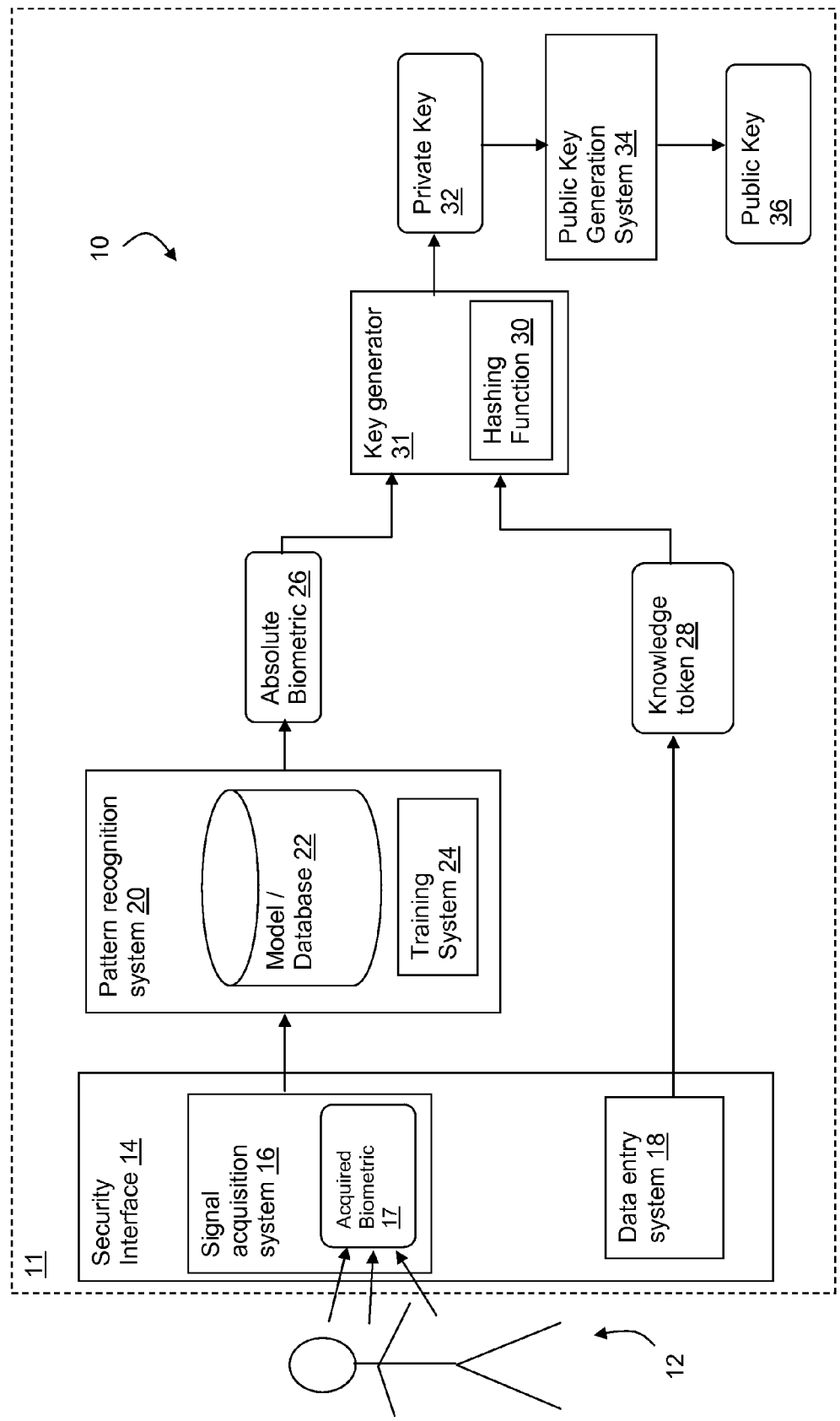
FIG. 1 depicts a private key generation system in accordance with an embodiment of the invention.

The drawings are merely schematic representations, not intended to portray specific parameters of the invention. The drawings are intended to depict only typical embodiments of the invention, and therefore should not be considered as limiting the scope of the invention. In the drawings, like reference numbering represents like elements.

DETAILED DESCRIPTION

FIG. 1 depicts an illustrative private key generation system 10 that generates a private key 32 for a user 12, which can, e.g., be utilized to generate a public key 36 utilizing a public key generation system 34. In this illustrative embodiment, private key generation system 10 includes a security interface 14 having a signal acquisition system 16 for obtaining an acquired biometric 17 from the user 12 and a data entry system 18 for obtaining and generating a knowledge token 28 from the user 12. Acquired biometric 17 may comprise any biometric information or combination of biometric data that can be readily collected using signal acquisition system 16, e.g., a fingerprint, a face image, retinal data, handwriting data, voice patterns, etc. Acquired biometric may be encoded in any format, e.g., as an image, as a data vector, etc. Knowledge token 28 may comprise any type of information that can be known and guarded by user 12, e.g., a password. Knowledge token may likewise be encoded in any format, e.g., as a binary string, voice data, etc. Accordingly, in a simple embodiment, security interface 14 may comprise a console having a camera that captures an image of the user 12 and a keyboard for entering a password. In another embodiment, security interface 14 may collect several biometric features, e.g., a fingerprint, retinal image and voice pattern, etc.

Once the acquired biometric 17 is obtained, it is passed to pattern recognition system 20 to determine the identity of the user 12. In this illustrative embodiment, a model/database 22 is utilized to evaluate the acquired biometric 17 and match it to one of a plurality of user models using any known technique. Accordingly, in this case, each user is required to pre-register and have an associated model created a priori. The associated model can be trained by training system 24 with biometric data from the user either in an off-line mode or over time in an on-line mode. Any type of modeling approach can be utilized, e.g., stochiastic, parametric, etc.

Once the user 12 is identified by pattern recognition system 20, an absolute biometric 26 of the user is retrieved and outputted. Absolute biometric 26 consists of fixed persistent set of biometric data that maps to the user 12. For instance, absolute biometric 26 may consist of a pre-stored image vector of the user 12. Thus, the absolute biometric 26 does not generally change over time (except e.g., during a system reset). Accordingly, each time a particular user 12 is recognized by pattern recognition system 20, the same absolute biometric 26 will be outputted. Moreover, in the event that a security infrastructure includes a plurality of deployed security interfaces 14 to generate private key 32, each will utilize a common absolute biometric 26 for the user 12. In contrast, acquired biometric 17 will typically vary over time due to, e.g., changing conditions of the signal acquisition system 16, changes in appearance of the user 12, noise, etc.

Once the absolute biometric 26 and knowledge token 28 are obtained, they are inputted to a key generator 31 to generate a private key 32. In this embodiment, key generator comprises a hashing function 30 that may comprise any known function for generating a cryptographic string based on two sets of inputted data. Once generated, private key 32 can be used for any purpose, e.g., to create a digital signature, to create public keys 36, etc.

The described system thus correlates private keys to an individual and the knowledge token 28 provides veracity with respect to the owner of the biometric data. As such, a third party trust is no longer required. Each user can carry their private key for data encryption and the infrastructure supports mobile and on demand encryption.

The following equations describe the process.

$k$=private key $B_a$=absolute biometric $B_q$=acquired biometric $C\_k$=Encryption function with private key $k$ $C\_k(x)=C\_k(B_a)$ $C_t$=cipher text $M(s,p)$=parametric or non parametric model where $s$ is the sample or feature vector and $p$ are the model parameters trained a priori $s=S(B_a)$, models the identity $p=P(B_a)$ models the noise $ID(M(s,p))=B_a$, ID is an identification function $ID(M(B_q,p))=B_a$ $k$=Key_Gen($B_a$,knowledge token), where Key_Gen is the hashing function.

For example, if $B_a$=iris byte code=10110101001101 ... 11, and the knowledge token is 1001001111, then the private key k is determined as follows:

$k$=Key_Gen(10110101001101 ... 11, 1001001111).

In FIG. 1, it is understood that security interface 14, pattern recognition system 20, key generator 31, public key generation system 34 may be implemented within a computer system 11. Computer system 11 may comprise a single integrated system or a distributed system. Each of the described modules may be implemented as software, hardware, or a combination of both using any known technology. Computer system 11 may be implemented in any fashion, and generally includes a processor, an input/output, a memory and a bus.

Figure 2:
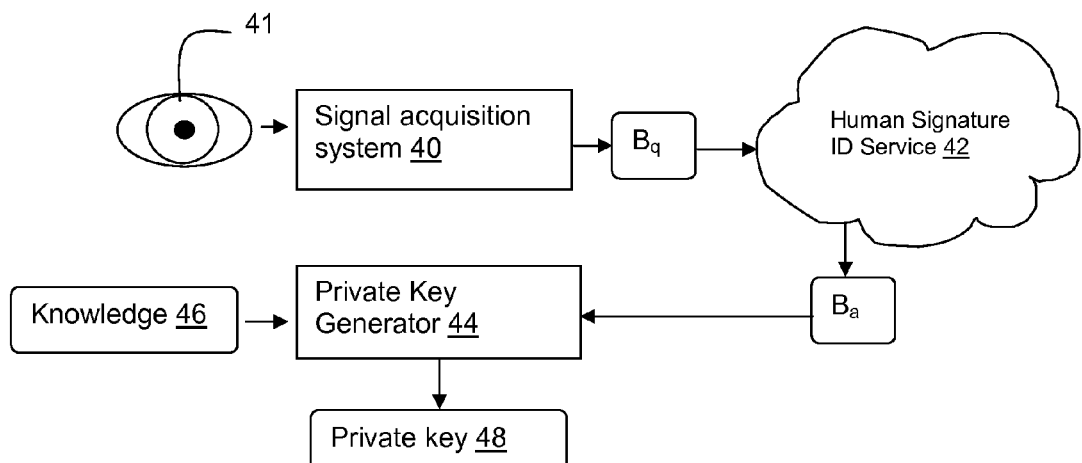
FIG. 2 depicts a private key generation system utilizing a network service in accordance with an embodiment of the invention.
Figure 3:
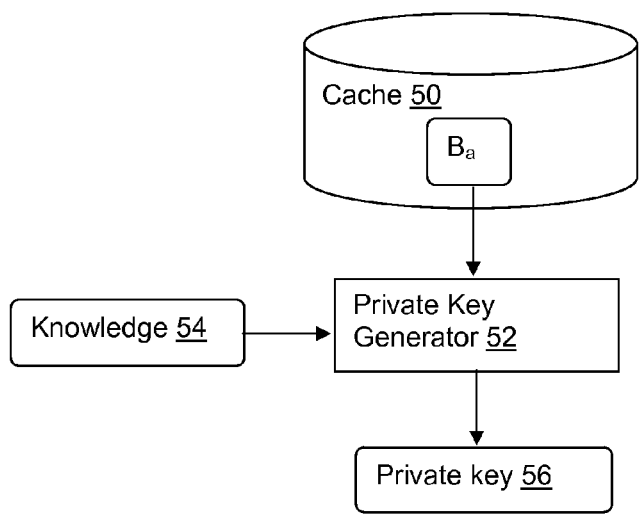
FIG. 3 depicts a private key generation system utilizing a cached absolute biometric in accordance with an embodiment of the invention.

FIGS. 2 and 3 depict further illustrative embodiments for generating a private key. In FIG. 2, a signal acquisition system 40 collects an acquired biometric $B_q$, e.g., from a retina 41, and sends the acquired biometric via a network such as the Internet to a human signature ID service 42. Human signature ID service 42 determines the identity of the user and outputs the absolute biometric $B_a$ of the user. Private key generator 44 then generates private key 48 based on the absolute biometric $B_a$ and knowledge (e.g., a password) 46 provided by the user.

FIG. 3 provides an implementation for the case where a network such as the Internet is not available. In this case, the user's absolute biometric $B_a$ is stored and retrieved from a cache 50 (e.g., in a laptop, a smart phone, etc.). Private key generator 52 generates private key 48 based on the absolute biometric $B_a$ obtained from cache 50 and knowledge (e.g., a password) 54 provided by the user. It is understood that the user's absolute biometric $B_a$ is preferable securely stored in cache 50 to ensure that only the user has access to it.

Accordingly, a biometric feature vector and salting token are utilized to produce a private key embodied, e.g., in a cryptographic string that inherently asserts identity with a high degree of identity veracity. The resulting private key can be used to create a digital signature, public keys, etc. The resulting use within a public key infrastructure will have a non-invertible relationship with an identity. Each individual carries a private key in the form of an open biometric and closed knowledge or token. The hidden data protects the key from being stolen in the form of an accessible piece of data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including Instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for generating a private key, comprising:
a signal acquisition system for obtaining biometric input from a user and encoding the biometric input into an acquired biometric;
a recognition system for determining an identity based on the acquired biometric and outputting an absolute biometric associated with the identity, wherein the absolute biometric comprises a fixed set of previously stored biometric data that maps to the user and does not change over time;
wherein the signal acquisition system sends the acquired biometric to the recognition system via a network, and
wherein the recognition system utilizes a model to determine the identity that is trained a priori with biometric data from the user;
an input device for accepting a knowledge input from the user; and
a key generator that generates a private key based on both of the knowledge input and the absolute biometric, wherein the key generator outputs a private key; and
a public key generation system for generating a public key, wherein the private key is used to generate the public key within the key generation system.

2. The system of claim 1, wherein the biometric input includes at least one signal selected from the group consisting of: a face image, a retinal scan, a fingerprint, a handwriting sample, and a voice pattern.

3. The system of claim 1, wherein the knowledge input comprises a password.

4. The system of claim 1, wherein the key generator utilizes a hashing function.

5. The system of claim 1, wherein the public key has a non-invertible relationship with the identity.

6. A computer program product for generating a private key, the computer program product comprising:

a non-transitory computer readable storage medium having computer readable program code embodied therewith, the computer readable program code comprising:

program code for encoding a biometric input from a user into an acquired biometric;

program code for determining an identity based on the acquired biometric and outputting an absolute biometric associated with the identity, wherein the absolute biometric comprises a fixed set of previously stored biometric data that maps to the user and does not change over time;

wherein the program code for encoding the biometric input sends the acquired biometric to a recognition system for determining the identity via a network, and wherein the program code for determining the identity utilizes a model that is trained a priori with biometric data from the user;

program code for accepting a knowledge input from the user; and program code for generating a private key based on both of the knowledge input and the absolute biometric, wherein a private key is outputted; and program code for generating a public key, wherein the private key is used to generate the public key.

7. The computer program product of claim 6, wherein the biometric input includes at least one signal selected from the group consisting of: a face image, a retinal scan, a fingerprint, a handwriting sample, and a voice pattern.

8. The computer program product of claim 6, wherein the knowledge input comprises a password.

9. The computer program product of claim 6, wherein the program code for generating the private key utilizes a hashing function.

10. A method for generating a private key, comprising:

encoding a biometric input from a user into an acquired biometric; determining an identity based on the acquired biometric and outputting an absolute biometric associated with the identity, wherein the absolute biometric comprises a fixed set of previously stored biometric data that maps to the user and does not change over time;

wherein encoding the biometric input includes sending the acquired biometric via a network to a recognition system for determining the identity via a network;

wherein determining the identity utilizes a model that is trained a priori with biometric data from the user;

receiving a knowledge input from the user; and generating a private key based on both of the knowledge input and the absolute biometric;

outputting a private key; and generating a public key using the private key.

11. The method of claim 10, wherein the biometric input includes at least one signal selected from the group consisting of: a face image, a retinal scan, a fingerprint, a handwriting sample, and a voice pattern.

12. The method of claim 10, wherein the knowledge input comprises a password.

13. The method of claim 10, wherein generating the private key utilizes a hashing function.

* * * * *